July 7, 1953 — K. TANKO ET AL — 2,644,614
POPCORN DISPENSER
Filed July 1, 1949 — 2 Sheets-Sheet 1

INVENTORS.
Kalman Tanko,
BY William L. Slominski

July 7, 1953 K. TANKO ET AL 2,644,614
POPCORN DISPENSER
Filed July 1, 1949 2 Sheets-Sheet 2

INVENTORS.
Kalman Tanko,
BY William L. Slominski,

Patented July 7, 1953

2,644,614

UNITED STATES PATENT OFFICE 2,644,614

POPCORN DISPENSER

Kalman Tanko and William L. Slominski,
Chicago, Ill.

Application July 1, 1949, Serial No. 102,528

2 Claims. (Cl. 222—146)

The present invention relates to dispensing machines and particularly to counter and floor dispensers for confections such as popcorn.

In order to store popcorn for dispensing purposes in quantities sufficient to warrant the expense of dispensing equipment and the space it occupies, popcorn must be stored in large quantities because of its bulk, must be dispensed carefully because of its fragileness, and must be dispensed through a comparatively narrow opening to direct the popcorn into a paper bag or box with or without the aid of a guiding chute.

Heretofore, in trying to meet these requirements a great deal of trouble has been experienced due to the lightness of popcorn. Gravity has little effect in dislodging interlocked flakes in the lower layers of stored popcorn which has become somewhat packed. Moreover, marshalling popcorn from a large storage space into a small dispensing opening with all the stored corn bearing down on top thereof has heretofore been solved only with complicated machinery, if it has been solved at all without mutilating the popcorn. Agitators have been tried but their size and the agitation exerted tends to pulverize the popcorn flakes. Vibrators have also been tried but the vibration set up in the stored body of popcorn by the agitators as well as the vibrators packs the corn even further and merely aggravates the difficulty rather than relieving it. Popcorn thus dispensed is an inferior confection.

The tendency of popcorn to interlock and pack under vibration and settle vertically appears to follow a pattern in which the central portions of the stored corn are supported in the container in an arching relationship upon laterally spaced lower flakes of corn which in turn are supported further out by other lower flakes until the bottom outer edges are reached at the sides of the container. We have noticed that this is particularly true with respect to openings leading from a large container, which openings are small enough to be useful in conducting popcorn to sacks or containers for consumption.

Whether this bridging effect is due to the way corn is emptied into the container when the container is filled is not clear, but once loosened and kept in a loosened condition in a space above the opening, popcorn flakes can and will slide or flow satisfactorily as whole flakes through a small opening from a large container, provided the flakes are not stuck together with butter, salt or flavoring.

One of the objects of the invention is to provide a popcorn dispensing storage device which maintains or establishes a flow looseness in the stored corn immediately ahead of a reduced dispensing opening.

Another object of the invention is to store popcorn in an extra large space and loosen the flakes by gravity to drop them into a reduced space having an entrance area greater than the bridging moment experienced with stored popcorn flakes, in which space the popcorn is kept warm against stickiness and at the bottom of which is slightly agitated to initiate dispensing movement of the flakes when a trapdoor is opened at one side or at the bottom of the second space.

A further object of the invention is to maintain warm all the walls of a popcorn storing container which have a horizontal component tending to give support to the popcorn in a vertical direction and counter to the normal action of gravity upon the corn.

Another object of the invention is to concentrate warming heat for the popcorn at the lowest point of storage and along a path followed by the corn as it enters and passes through a dispensing opening.

The invention is also characterized by widely rounded corners at the mouth of a space of reduced cross-sectional area below a popcorn storage container so that the characteristic bridging angle experienced with popcorn stored in such a reduced cross-sectional area is at an obtuse angle to the curve of the corners.

A further object of the invention resides in an element and movement thereof which nudges the popcorn downwardly when the dispensing begins, which permits popcorn to flow around it, and which provides a gentle lifting to the corn at the center of stored mass when dispensing is stopped.

Another object of the invention is to provide a popcorn storage device of utmost simplicity and of such a lightweight construction that it can be moved very easily from one location to another and also movable as a unit to dispense popcorn into stationary receptacles as well as into receptacles brought to it for replenishing.

These being among the objects of the invention, other and further objects will become apparent from the drawings, the description relating thereto, and the appended claims.

Figure 1:
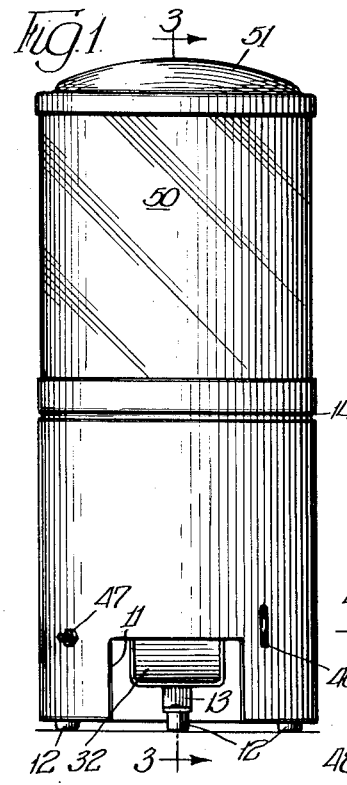
Fig. 1 is a front elevational view of a popcorn dispenser embodying the preferred form of the invention.
Figure 3:
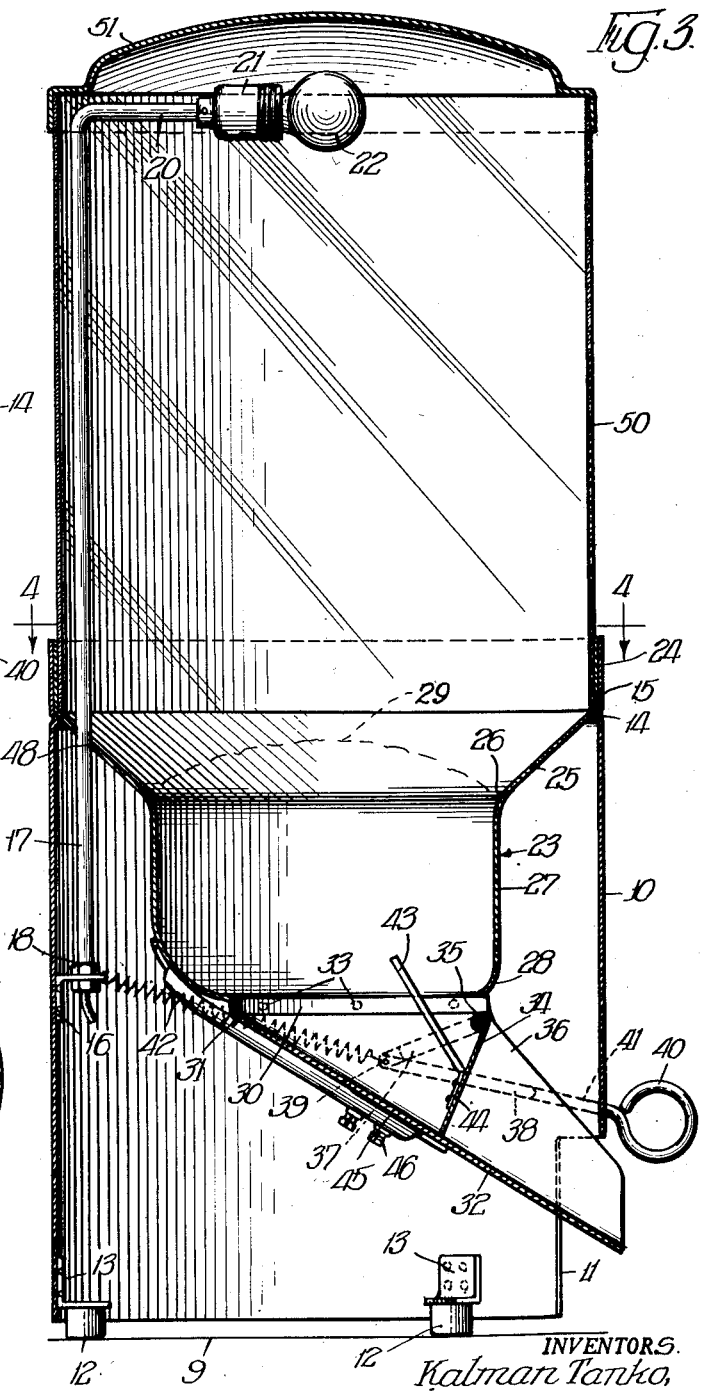
Fig. 3 is an enlarged sectional view taken upon the line 3—3 in Fig. 1.
Figure 2:
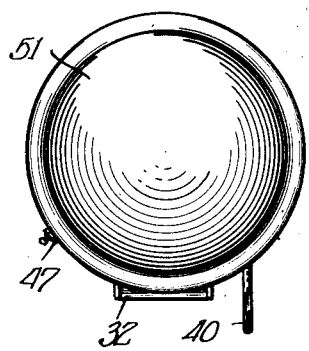
Fig. 2 is a top plan view of the dispenser shown in Fig. 1.
Figure 4:
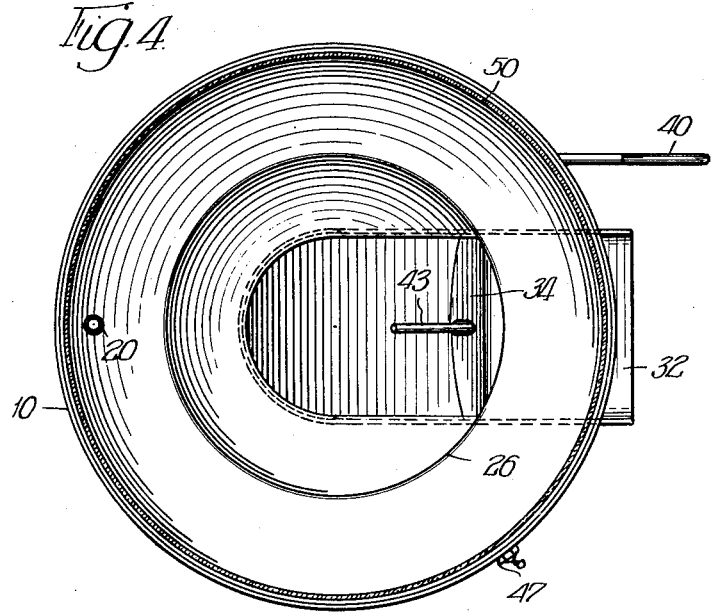
Fig. 4 is a section taken upon the line 4—4 in Fig. 3.

In our invention we prefer to store popcorn in as big a space as possible so that replenishing service is minimized, and as the popcorn is dispensed move the popcorn downwardly through tapering walls to a secondary space wide enough that popcorn which has settled in the big space cannot bridge from one side of the tapering wall to the other when the popcorn below the tapering walls is drained away. This secondary space is preferably cylindrical to its bottom. An opening is provided in the bottom through which the popcorn moves into a chute and directed laterally thereby to flow around a movable rod in its path and into some suitable container such as a paper bag or box. With this arrangement the popcorn will have no chance of becoming packed in the secondary cylindrical space and the movable rod as mounted upon the gate which opens and closes the chute to the outside moves in a vertical plane into the mass of stored popcorn to occupy space and to jostle the popcorn flakes mildly when the gate is closed. Then when the gate is again opened, the rod relinquishes its space, thereby leaving the corn flakes in loosened condition and, as it leaves, nudges the first few flakes out through the gate opening.

Moreover, as a part of the invention we prefer to make the inclined walls and the walls of the secondary space out of aluminum and place a heater along the bottom side of the chute in heat exchange relationship therewith to warm the chute and the walls, not only to keep the popcorn warm and crisp, but also to prevent tackiness in the butter or seasoning on the popcorn which moves into the secondary space and out through the chute. The aluminum is anodized wherever it comes in contact with the popcorn.

In carrying out this relationship we prefer to provide a cylindrical base 10 with an opening 11 through the front wall thereof at the bottom edge. The base is supported on a table top 9 by rubber feet 12 mounted on the base by L-brackets 13 welded to the inside walls of the base. Instead of rubber feet, a stand can be secured to the brackets 13 to make a floor dispenser out of the device. A short distance below its upper edge the base is provided with an inwardly extending circumferential groove 14 upset to form a weight-bearing shoulder 15 upon the upper face thereof.

At the rear and partway up its inner face the base is provided with another L-shaped bracket 16 apertured to receive an electrical conduit section threaded to receive nuts 18 that secure the conduit in upright position. The conduit in turn is bent at the top to provide a horizontal section 20 which receives a lamp socket 21 and an electrical lamp bulb 22.

Preferably a spun aluminum cup-shaped member 23 is received within the base 10 to provide a bottom for a popcorn storage container. The cup has an upper axial flange portion 24 telescoping snugly within the base portion above the flange 14 and is provided with an inwardly tapering wall 25 resting against the shoulder 15 at its outer edge and rounded as at 26 with a smooth round curve of preferably 1¼" radius for the purpose already mentioned in the objects, and this curve ends at its inner edge in a cylindrical portion 27. The portion 27 is not quite cylindrical because a slight taper is left by the spinning die, but the wall is made as cylindrical as possible to eliminate any appreciable inwardly cramping action to popcorn present therein as it moves downwardly. The spun member terminates at the bottom in an inwardly rounded portion 28 apertured and upset downwardly to provide an opening 30 surrounded by a downwardly extending flange 31.

A chute 32 having a corresponding upper contour and also made preferably from aluminum is riveted to the flange 30 by rivets 33. The chute conducts popcorn from the opening 30 through the opening 11 in the base and beyond the wall thereof with sufficient clearance that a bag or box can be inserted under the lower end of the chute to catch popcorn tumbling out.

In order to control the dispensing of popcorn through the chute, a door 34 is provided which is bent around and rigidly secured to a crank pin 35 that in turn is journalled at both ends in the walls 36 of the chute near their upper edge in close proximity to the flange 30 at the front end of the popcorn dispenser. The crank arm 37 of the crank pin 35 is pivotally linked in supporting relation by a cotter pin 39 to the inner end of a pull rod 38 looped at the outer end as at 40 to provide a handle. The pull rod at its outer end is supported in a hole 41 provided for that purpose in the base at the front thereof but to one side of the opening 11. At the rear end of the pull rod 38 the cotter pin receives one end of a tension spring 42 therein whose other end is secured to the bracket 16 to urge the pull rod to its innermost position. The crank 37, the door 34, and the pull rod 38 are so constructed and arranged that the door is urged to a normally closed position by the spring 42 but may be opened at will by an operator by pulling upon the handle 40. The inner limit of movement is limited by a stop 49 mounted on the adjacent wall of the chute.

Upon the back side of the door 34 an L-shaped rod 43 is welded as at 44 to extend into the space occupied by popcorn and substantially parallel with the bottom of the chute when the door is closed. Then as the door is opened when the handle 40 is pulled, the rod 43 moves in a vertical plane downwardly to relinquish its position and thereby afford increased room for popcorn present there, and also nudges the popcorn behind the door forwardly, out from under the door and through the chute opening 11. When the handle 40 is released, the rod returns rearwardly and gives a slight upward push upon the popcorn restrained behind the door, jostles it mildly without breaking the flakes, and assumes its former position assuring looseness of the popcorn therein.

Figure 5:
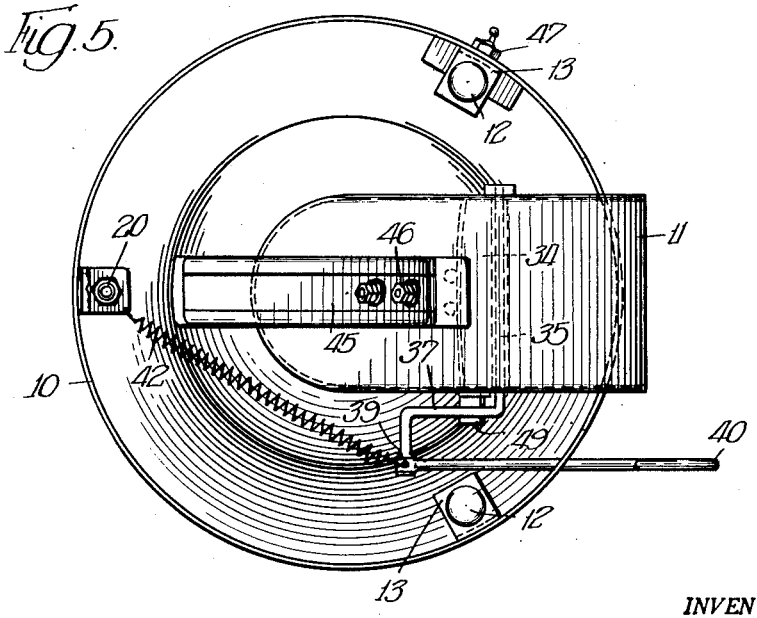
Fig. 5 is a bottom view of the dispenser shown in the other views.

Along the bottom side and extending down a distance preferably as far as the door 34, a heating element 45 of the Calrod or concealed filament type is mounted with binding posts 46 thereon for connecting the filament in circuit with the house current through a toggle switch 47 (Fig. 5) mounted on the housing 10 at one side thereof.

The lamp 22 and heater 45 are connected in parallel, on one side with one side of the house line through an extension cord (not shown), and on the other side with the other side of the house line through the switch 47. The feet 12 support the base 10 high enough that the extension cord can extend out from under the base any place around the base. The cup 23 is apertured as at 48 to receive the conduit 17 therethrough in supported relationship.

A sheet of transparent plastic is rolled into a cylindrical member 50 and adhered along its overlapping edges to fit just inside the flange 24 on the cup 23 and rest on the upper outer edge of the tapered wall 25. The plastic sheet thus formed serves as a transparent container wall through which is displayed the contents and provides a neat and pleasing appearance for storing popcorn ready for dispensing. The member can be easily removed any time for cleaning and to afford access to the interior of the cup for cleaning all the parts contacting the popcorn.

The top of the cylindrical member 50 is closed by a readily removable cover 51 which rests upon the top edge of the member in weight-supported relation and preferably is opaque as spun from sheet metal to reflect the colored light of the bulb 22 downwardly on the contents of the dispenser.

In operation the top or cover 51 is removed and the container defined by the cup 23 and transparent wall 50 is filled with popcorn flakes. The extension cord is plugged in and the light and heater turned "on." The heater warms the bottom of the trough 32 and by conduction through the aluminum body, and also the surrounding air, warms the walls of the cup 23 and thereby the popcorn flakes contained therein.

When it is desired to remove popcorn from the container a paper sack or other receptacle is placed under the lower end of the chute and the handle 40 is pulled outwardly to move the door 34 forwardly and upwardly. While the door is moving, the rod 43 moves downwardly and forwardly, frees the popcorn flakes behind it, and urges the popcorn between it and the door outwardly in the chute. This causes a vacancy within the upper reaches of the chute. The popcorn immediately above the opening 30 then tumbles down into the chute and rolls out. As it tumbles downwardly from the body of loose popcorn in the cylindrical portion of the cup, it is replaced from the loosened portions above it in the cylindrical portion 23. Popcorn moving downwardly in the cylindrical section is replenished from the main body above.

By way of understanding the improved operation of the embodiment of the invention it may be presumed for explanation that the popcorn may have become quite packed in the large portion of the container. Then when the door is opened, the rod 43 loosens and jostles the popcorn sufficiently to cause the popcorn to tumble down the chute from behind the door, thus leaving space in the chute to receive popcorn from above. If the popcorn above is held due to the rounded slope of the edges around the chute opening, closure of the door will cause the rod to nudge the lowermost flakes upwardly to break any interlock within the area of the chute opening. This upward nudging loosens any possible packing which might occur in the lowermost portions of the cup, and since the cross-section contour of the lower cylindrical portion is constant there can be no increased packing as the popcorn moves downwardly in this area. In fact, in this space the popcorn loosens itself as the bottom layers begin to move.

With this movement downwardly, any bridging effect present within the level of the tapered walls is broken by the span being too wide to support against gravity and, the entrance edges being well rounded, free border flakes the moment they get below the potential bridging arch. Thus the flakes cannot support themselves above the cylindrical reduced portion and thereby fall loosely therein and downwardly without packing.

Because of this, the storage space above the cylindrical portion can be as big as desired without danger of popcorn jams occurring, which prevent dispensing of whole flakes.

The warmth keeps the corn from becoming tacky, and the air space between the bottom and the cylindrical wall traps and insulates the cup portion from heat loss.

Depending upon the size of the popcorn flakes being dispensed, we have found that with the jumbo flakes the best cross dimension of the reduced portion is eight inches. With smaller popcorn flakes this dimension can be somewhat less, but preferably not less than approximately six inches. The size and shape of the remaining parts described are preferably in proportion as shown in the drawings.

Consequently, although a preferred embodiment of the invention is shown and described herein, it will be readily apparent to those skilled in the art how various modifications and changes can be made without departing from the spirit of the invention, the scope of which is commensurate with the appended claims.

What is claimed is:

1. In a popcorn dispensing device, the combination of a cylindrical base internally flanged adjacent its upper marginal edge to define an upwardly facing shoulder, and having a first opening through one side near the bottom edge, a cup member having two vertically spaced cylindrical walls of different diameters interconnected by a tapering wall rounded into the contour of the wall of smaller diameter, said cup member resting on said shoulder at the upper marginal edge of said tapering wall with the larger cylindrical surface telescoping in the upper marginal edge of the base, said cup member having a second opening in the bottom thereof, a chute supported below the second opening and extending outwardly through said first opening, a gate in said chute, means for operating said gate, a transparent cylindrical member telescoping within the larger of said cylindrical walls of the cup member and resting on said tapered wall, and a removable closure for the top of said transparent cylindrical member.

2. In a popcorn dispensing device, the combination of a base internally flanged adjacent its upper marginal edge to define an upwardly facing shoulder, and having a first opening through one side near the bottom edge, a cup member having two vertically spaced vertical walls of different sectional dimensions interconnected by a tapering wall rounded into the contour of the wall of the smaller dimension, said cup member resting on said shoulder at the upper marginal edge of said tapering wall with the wall of larger dimension telescoping in the upper marginal edge of the base in sealed relationship, said base defining an area of static air around said cup member proximate the smaller and the tapering walls, said cup member having a second opening in the bottom thereof, a chute supported below the second opening and extending outwardly through said first opening, a gate pivotally mounted within said chute, means for operating said gate, a heater disposed below said chute, a transparent cylindrical member telescoping within the larger of said cylindrical walls of the cup member and resting on said tapered wall, and a removable closure for the top of said transparent cylindrical member.

KALMAN TANKO.
WILLIAM L. SLOMINSKI.

References Cited in the file of this patent

UNITED STATES PATENTS

| Number | Name | Date |
|---|---|---|
| 164,801 | Bryan | June 22, 1875 |
| 780,938 | Clarke | Jan. 24, 1905 |
| 961,470 | Warren | June 14, 1910 |
| 975,958 | Johnson | Nov. 15, 1910 |
| 1,257,088 | Marlin | Feb. 19, 1918 |
| 1,312,320 | Grenier | Aug. 5, 1919 |
| 1,767,009 | Morin | June 24, 1930 |
| 1,931,908 | Tillotson | Oct. 24, 1933 |
| 1,973,241 | Wilkes | Sept. 11, 1934 |
| 2,194,852 | Gundelfinger et al. | Mar. 26, 1940 |
| 2,201,655 | Srodulski | May 21, 1940 |
| 2,252,101 | Tveter | Aug. 12, 1941 |